United States Patent
Lee

(10) Patent No.: US 7,382,556 B2
(45) Date of Patent: Jun. 3, 2008

(54) LENS MODULE

(75) Inventor: Chun-Yu Lee, Tu-Cheng (TW)

(73) Assignee: Hon Hai Precision Industry Co., Ltd., Tu-Cheng, Taipei Hsein (TW)

( * ) Notice: Subject to any disclaimer, the term of this patent is extended or adjusted under 35 U.S.C. 154(b) by 0 days.

(21) Appl. No.: 11/478,410

(22) Filed: Jun. 28, 2006

(65) Prior Publication Data

US 2007/0058272 A1 Mar. 15, 2007

(30) Foreign Application Priority Data

Sep. 9, 2005 (CN) .................... 200510037209.6

(51) Int. Cl.
G02B 7/02 (2006.01)
G02B 15/02 (2006.01)
G02B 3/00 (2006.01)
H01S 3/04 (2006.01)

(52) U.S. Cl. .............. 359/820; 359/819; 359/649; 359/674; 359/789; 372/34; 353/52; 353/101; 353/102; 348/175; 347/257

(58) Field of Classification Search .......... 359/665, 359/813, 819, 820, 822–825, 649, 674, 676, 359/729, 739, 789, 790, 511, 333, 342, 345, 359/425; 353/52, 84, 85, 101, 102, 108; 372/33–35, 69, 70, 71, 92, 98, 101, 109; 348/175; 347/247, 257; 356/135; 355/53, 355/56; 399/220; 396/7, 22, 219
See application file for complete search history.

(56) References Cited

U.S. PATENT DOCUMENTS

| | | | | |
|---|---|---|---|---|
| 4,241,982 A | * | 12/1980 | Uesugi | 359/704 |
| 4,682,214 A | * | 7/1987 | Sato et al. | 348/175 |
| 4,910,741 A | * | 3/1990 | Pillsbury et al. | 372/34 |
| 6,104,546 A | * | 8/2000 | Yoshikawa | 359/674 |
| 6,359,740 B1 | * | 3/2002 | Tsuchiya | 359/819 |
| 6,603,614 B2 | * | 8/2003 | Fulkerson et al. | 359/820 |
| 6,661,568 B2 | * | 12/2003 | Hollemann et al. | 359/333 |
| 6,741,405 B1 | * | 5/2004 | Chen | 359/813 |
| 6,900,913 B2 | * | 5/2005 | Chen | 358/474 |
| 6,939,456 B2 | * | 9/2005 | Shiau | 250/208.1 |
| 6,940,058 B2 | * | 9/2005 | Shiau | 250/208.1 |
| 7,009,781 B2 | * | 3/2006 | Oshima et al. | 359/697 |
| 7,057,833 B2 | * | 6/2006 | Ooi et al. | 359/819 |
| 7,095,572 B2 | * | 8/2006 | Lee et al. | 359/808 |

* cited by examiner

*Primary Examiner*—Loha Ben
(74) *Attorney, Agent, or Firm*—Jeffrey T. Knapp

(57) ABSTRACT

A lens module (800) includes a lens barrel (20), a base (10), and a temperature compensation module (30). A first lens (201) is disposed in the lens barrel. The lens barrel is disposed in the base. The temperature compensation module is detachably installed in the base, and the temperature compensation module includes a temperature compensation lens (302). The temperature compensation lens is configured for compensating for deformation of the first lens caused by temperature changes.

17 Claims, 2 Drawing Sheets

LENS MODULE

TECHNICAL FIELD

The present invention generally relates to lens modules used in photography and imaging equipment and, more particularly, to a lens module for a digital camera.

BACKGROUND

Currently, digital camera modules are included as a feature in a wide variety of portable electronic devices. Most portable electronic devices are becoming progressively more miniaturized over time, and digital camera modules are correspondingly becoming smaller and smaller. Nevertheless, in spite of the small size of a contemporary digital camera module, consumers still demand excellent imaging.

Most digital camera modules contain lens modules for taking high quality photos. Aspheric lenses are typically used in lens modules for miniaturizing digital cameras. Plastic aspherical lenses have low cost, and are widely used in lens modules. However, plastic aspherical lenses may become deformed at high or low temperatures. Thus, plastic aspherical lenses have a lower optical stability at high or low temperatures, and the digital camera has a lower image quality when using plastic aspheric lenses in extreme conditions.

Therefore, a lens module for a digital camera which can overcome the above-described problems is desired.

SUMMARY

In one embodiment, a lens module includes a lens barrel, a base, and a temperature compensation module. A first lens is disposed in the lens barrel. The lens barrel is disposed in the base. The temperature compensation module is detachably installed in the base, and the temperature compensation module includes a temperature compensation lens. The temperature compensation lens is configured for compensating for deformation of the first lens caused by temperature changes.

Other objects, advantages and novel features will become more apparent from the following detailed description when taken in conjunction with the accompanying drawings.

BRIEF DESCRIPTION OF THE DRAWINGS

Many aspects of the lens module can be better understood with reference to the following drawings. The components in the drawings are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF THE EMBODIMENTS

Figure 1:
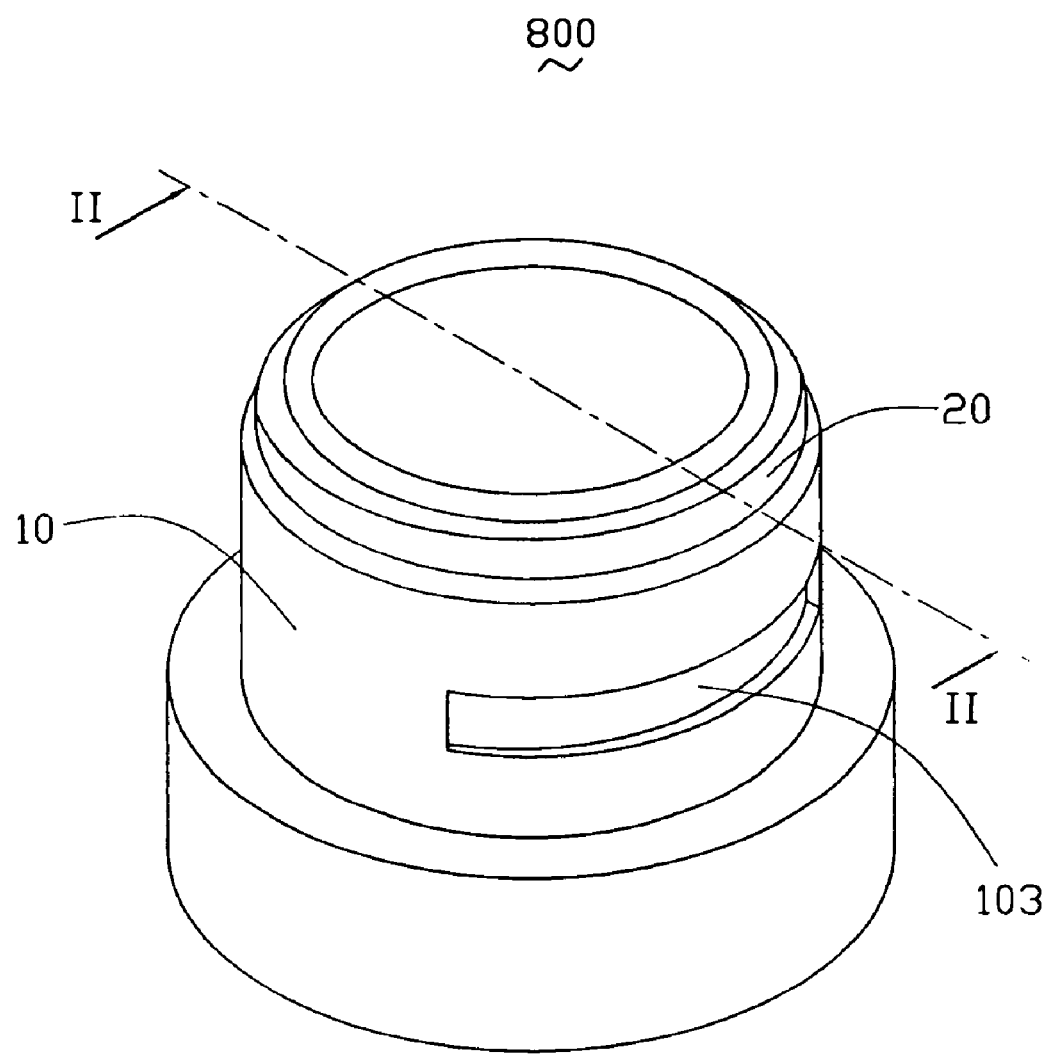
FIG. 1 is a schematic view of a lens module in accordance with a preferred embodiment.
Figure 2:
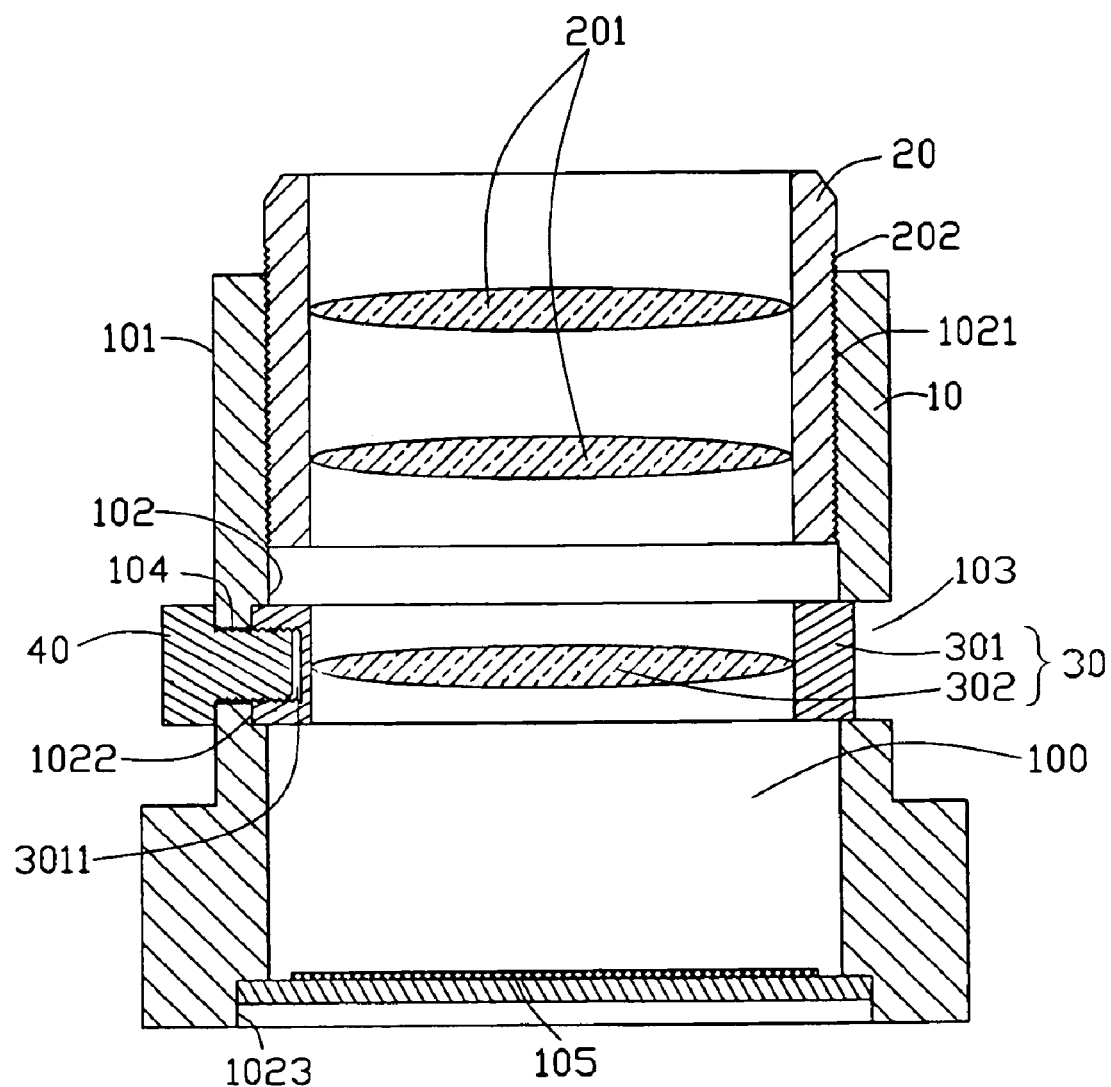
FIG. 2 is a schematic, cross-sectional view of the lens module along line II-II in FIG. 1.

Referring to FIGS. 1 and 2, in a preferred embodiment, a lens module 800 includes a base 10, a lens barrel 20, and a temperature compensation element 30.

The base 10 is a hollow cylinder, and a through hole 100 is formed in a central area of the base 10. The base 10 has an inner wall 102 and an outer wall 101. An upper portion of the inner wall 102 has a first screw thread 1021, and a lower portion of the inner wall 102 has an annular groove 1022. An arcuate hole 103 is formed on the outer wall 101 of the base 10, and the arcuate hole 103 penetrates through the outer wall 101 and the inner wall 102 at the position of the annular groove 1022. Thus, the arcuate hole 103 communicates with the through hole 100. A first screw hole 104 is formed at an opposite position to the arcuate hole 103 on the outer wall 101, and the first screw hole 104 communicates with the annular groove 1022. The first screw hole 104 is configured for securing the temperature compensation element 30 cooperating with a screw bolt 40. The base 10 also includes a step portion 1023 along the through hole 100 for holding an image sensor 105. The image sensor 105 can be a charge coupled device (CCD) or a complementary metal-oxide-semiconductor transistor (CMOS).

The lens barrel 20 has a second screw thread 202 in accordance with the first screw thread 1021 of the base 10, and the lens barrel 20 is installed in the through hole 100 of the base 10 by cooperation of the first and second screw threads 1021, 202. A first lens group 201 is disposed in the lens barrel 20. In this embodiment, the first lens group 201 includes two lenses. The lenses can be aspherical lenses, spherical lenses, or combinations thereof. The lenses are typically made of transparent plastic material, such as polycarbonate, polymethyl methacrylate, or any desired combination thereof.

The temperature compensation element 30 includes a cylindrical holder 301, and at least one temperature compensation lens 302 disposed in the cylindrical holder 301. A second screw hole 301 is formed on the cylindrical holder 301, and the cylindrical holder 301 is secured in the annular groove 1022 of the base 10 using a screw bolt 40 extending through the first screw hole 104 into the second screw hole 3011. The temperature compensation lens 302 is configured for compensating for deformation of the first lens group 201 at high and low temperatures. The temperature compensation lens 302 is typically a glass lens, because a glass lens has a lower deformation at different temperatures.

An exemplary method for designing the temperature compensation lens 302 is provided. Firstly, a first group of optical parameter of the first lens group 201 is measured at room temperature. Secondly, a second group of optical parameter of the first lens group 201 is measured at low temperature and high temperatures. Thirdly, the first and second optical parameters are compared, and a difference in optical parameter is obtained. Finally, the temperature compensation lens 302 is designed in accordance with the difference in optical parameters. The optical parameters can be refractive index or dispersive power. Understandably, different temperature compensation lenses 302 can be designed for compensating for the deformations of the first lens group at different temperatures.

When assembling the lens module 800, firstly, the lens barrel 20 is installed in the base 10 by the cooperation of the first and second screw threads 1021, 202. Then, the temperature compensation element 30 is installed in the annular groove 1022 of the base 10 through the arcuate hole 103, and secured using the screw bolt 40 through the first screw hole 104 and the second screw hole 3011. Understandably, the temperature compensation element 30 can be changed by loosening the screw bolt 40.

It is believed that the present embodiments and their advantages will be understood from the foregoing description, and it will be apparent that various changes may be made thereto without departing from the spirit and scope of the invention or sacrificing all of its material advantages, the examples here before described merely being preferred or exemplary embodiments of the invention.

What is claimed is:

1. A lens module, comprising:
   a base having an inner wall and a first screw thread formed on a portion of the inner wall;
   a lens barrel having a second screw thread formed thereon and being disposed in the base by cooperation of the first and second screw threads, a first lens being disposed in the lens barrel; and
   a temperature compensation element detachably installed in the base, the temperature compensation element including a temperature compensation lens configured for compensating for deformation of the first lens caused by temperature changes.

2. The lens module as claimed in claim 1, wherein the base is a hollow cylinder, and a through hole is formed in center of the base, the base further has an outer wall.

3. The lens module as claimed in claim 2, wherein a groove is formed on a portion of the inner wall of the base, and the temperature compensation element is disposed in the groove.

4. The lens module as claimed in claim 3, wherein an arcuate hole is formed on the outer wall of the base, and the arcuate hole communicates with the through hole.

5. The lens module as claimed in claim 4, wherein a first screw hole is formed opposite to the arcuate hole on the outer wall, the first screw hole communicating with the annular groove of the base.

6. The lens module as claimed in claim 5, wherein the temperature compensation element includes a cylindrical holder, the temperature compensation lens is disposed in the cylindrical holder, and the cylindrical holder is detachably mounted to the base.

7. The lens module as claimed in claim 6, wherein a second screw hole is formed on the cylindrical holder, and the cylindrical holder is secured in the base using a screw bolt extending through the first screw hole into the second screw hole.

8. The lens module as claimed in claim 1, wherein temperature compensation lens is made of glass.

9. The lens module as claimed in claim 1, wherein the first lens is an aspheric lens.

10. The lens module as claimed in claim 1, wherein the first lens is made of plastic material.

11. A digital camera module, comprising:
    a base;
    a lens barrel disposed in the base and at one end thereof, a first lens being disposed in the lens barrel;
    a temperature compensation element detachably installed in the base, the temperature compensation element including a temperature compensation lens configured for compensating for deformation of the first lens caused by temperature changes; and
    an image sensor disposed at another end of the base for receiving an image from the first lens and the temperature compensation element.

12. The digital camera module as claimed in claim 11, wherein the temperature compensation element includes a cylindrical holder, the temperature compensation lens is disposed in the cylindrical holder, and the cylindrical holder is detachably mounted to the base.

13. The digital camera module as claimed in claim 12, wherein the cylindrical holder is secured in the base using a screw bolt.

14. A lens module comprising:
    a lens barrel including a lens disposed therein and configured for directing light toward an image media; and
    a base having an axial hole receiving the lens barrel therein, and a radial hole in communication with the axial hole, the radial hole being configured so as to allow insertion and withdrawal of a temperature compensation element into and from the base, the temperature compensation element being configured for compensating for deformation of the lens caused by temperature changes.

15. The lens module of claim 14, wherein the base defines a groove in an inner periphery thereot the groove being in communication with the radial hole, and the groove is configured for receiving the temperature compensation element.

16. The lens module of claim 15, wherein the groove is located between the lens and the image media.

17. The lens module of claim 14, wherein the image media is an image sensor.

* * * * *